(12) United States Patent
Meyer

(10) Patent No.: US 11,927,270 B2
(45) Date of Patent: Mar. 12, 2024

(54) DIAPHRAGM POPPET VALVE

(71) Applicant: Aventics GmbH, Laatzen (DE)

(72) Inventor: Heinz-Hermann Meyer, Seelze (DE)

(73) Assignee: Aventics GmbH, Laatzen (DE)

( * ) Notice: Subject to any disclaimer, the term of this patent is extended or adjusted under 35 U.S.C. 154(b) by 101 days.

(21) Appl. No.: 17/611,133

(22) PCT Filed: May 14, 2020

(86) PCT No.: PCT/DE2020/100421
§ 371 (c)(1),
(2) Date: Nov. 13, 2021

(87) PCT Pub. No.: WO2020/228911
PCT Pub. Date: Nov. 19, 2020

(65) Prior Publication Data
US 2022/0221063 A1   Jul. 14, 2022

(30) Foreign Application Priority Data

May 14, 2019   (DE) ............... 10 2019 003 379.5

(51) Int. Cl.
*F16K 11/044*   (2006.01)
*F16K 1/44*   (2006.01)
(Continued)

(52) U.S. Cl.
CPC .............. *F16K 1/443* (2013.01); *F16K 27/02* (2013.01); *F16K 27/0236* (2013.01);
(Continued)

(58) Field of Classification Search
CPC . F16K 1/443; F16K 1/446; F16K 7/14; F16K 7/17; F16K 11/044; F16K 11/056;
(Continued)

(56) References Cited

U.S. PATENT DOCUMENTS 2,850,330 A * 9/1958 Andrews ............... B60T 13/403
    303/29
2,942,837 A   6/1960 Bauerlein
(Continued)

FOREIGN PATENT DOCUMENTS

AT   262703 B   6/1968
CN   1696555 A   11/2005
(Continued)

OTHER PUBLICATIONS

International Search Report corresponding to PCT Application No. PCT/DE2020/100421, dated Jul. 24, 2020 (German and English language document) (6 pages).

*Primary Examiner* — Hailey K. Do
(74) *Attorney, Agent, or Firm* — Maginot, Moore & Beck LLP

(57) ABSTRACT

A diaphragm poppet valve has a control diaphragm which is resilient in shape and separates a control chamber from a working chamber. The control diaphragm is designed as a single piece on the side thereof facing the control chamber or the working chamber of the diaphragm poppet valve with a hollow portion and on the side thereof facing the working chamber with a diaphragm valve seat. The interior of the hollow portion issues into the diaphragm valve seat and the hollow portion is connected to a fluid channel in the diaphragm poppet valve. The diaphragm poppet valve is easy to clean because the interior of the hollow projection and the diaphragm valve seat formed by the control diaphragm can easily be flushed.

11 Claims, 4 Drawing Sheets

(51) Int. Cl.
*F16K 27/02* (2006.01)
*F16K 31/126* (2006.01)

(52) U.S. Cl.
CPC ...... *F16K 27/0263* (2013.01); *F16K 31/1266* (2013.01); *F16K 1/446* (2013.01); *F16K 11/044* (2013.01)

(58) Field of Classification Search
CPC ...... F16K 11/022; F16K 11/10; F16K 11/105; F16K 27/0236; F16K 27/0263; F16K 31/1266
See application file for complete search history.

(56) References Cited

U.S. PATENT DOCUMENTS

| | | | | |
|---|---|---|---|---|
| 3,528,455 | A * | 9/1970 | Kreuter | F24F 11/62 137/625.65 |
| 4,108,205 | A * | 8/1978 | Hawley | F16K 11/044 137/625.5 |
| 4,370,996 | A * | 2/1983 | Williams | G05D 11/035 137/99 |
| 4,439,114 | A * | 3/1984 | Kimmell | F04B 9/1035 91/40 |
| 5,931,187 | A | 8/1999 | Williams | |
| 6,959,725 | B2 * | 11/2005 | Yoshino | G05D 16/065 137/505.25 |
| 2018/0348801 | A1 * | 12/2018 | Grödl | G05D 16/2097 |

FOREIGN PATENT DOCUMENTS

| | | |
|---|---|---|
| DE | 43 08 747 C2 | 5/1997 |
| DE | 197 11 262 A1 | 9/1998 |
| DE | 11 2011 101 201 B4 | 3/2017 |
| DE | 10 2015 223 943 A1 | 6/2017 |
| JP | 2001-208237 A | 8/2001 |

* cited by examiner

DIAPHRAGM POPPET VALVE

This application is a 35 U.S.C. § 371 National Stage Application of PCT/DE2020/100421, filed on May 14, 2020, which claims the benefit of priority to Serial No. DE 10 2019 003 379.5, filed on May 14, 2019 in Germany, the disclosures of which are incorporated herein by reference in their entirety. The disclosure relates to a diaphragm seat valve.

BACKGROUND

Diaphragm valves known in the prior art generally serve for separating a control chamber from a working chamber. This serves for example for separating media during the use of different control and working media (for example gas/fluid) or for ensuring adequate hygiene requirements in hygienically sensitive requirement areas, for example for applications in the area of medicine (life science) or of food and drink production (food/beverage). The separation of the control and working chambers often serves at the same time for ensuring adequate ability for cleaning (cleaning in place, CIP) of the working chamber of residues of a working medium or adequate ability for disinfection (sterilization in place or steam in place, SIP) of the working chamber. For avoiding dead spaces and for minimizing the required cleaning or disinfection outlay, the simplest possible valve structure with the fewest possible individual parts is desirable here.

AT 262703 B has disclosed a 3/2 solenoid valve of seat-type design in which a double-seat closure piece consisting of an elastic plastic compound is formed with hose-like projections on both sides in an axial direction, wherein an actuating bar mechanism of a magnet armature engages into the hose-like projections. The diaphragm-like covering of the double-seat closure piece serves for sealing of the control part (of the magnet armature chamber) with respect to the working part of the valve for the use of highly corrosive gases or liquids. The multi-way solenoid valve disclosed by AT 262703 B has a relatively complex construction composed of small parts, wherein the double-seat closure piece has to be laboriously formed as a covering on a bar mechanism of the magnet armature. Furthermore, AT 262703 B does not disclose any technical solution for a pressure medium-based valve actuation. Finally, the sealing surfaces of the double-seat closure piece are designed as movement seals which realize frictional engagement with the corresponding sealing seats and are therefore subject to relatively significant aging for functional reasons.

DE 4308747 C2 discloses a 3/2 solenoid valve of seat-type design with a of the sealing of a magnet armature chamber with respect to a working part of the valve against aggressive working media. For sealing of the magnet armature chamber against a medium flowing through the valve, provision is made of a diaphragm formed integrally with a seal device which can be displaced in the end region along the flow and which has sealing surfaces for abutment against a valve seat, wherein an extension part of the magnet armature device protrudes as far as the region of the seal device and is in engagement therewith via a spring connection. The mixing valve disclosed by DE 4308747 C2 has a relatively complex construction composed of small parts, wherein the displaceable seal device, which has sealing surfaces for abutment against a first valve seat, is designed as a movement seal which realizes frictional engagement with the corresponding sealing seats and is therefore subject to relatively significant aging for functional reasons. Finally, DE 4308747 C2 does not disclose any technical solution for a pressure medium-based valve actuation.

DE 112011101201 B4 discloses a 3/3 solenoid valve of seat-type design with a solenoid seal for sealing of the magnet armature chamber with respect to the working part. The solenoid valve disclosed by DE 112011101201 B4 has a relatively complex construction composed of small parts for design reasons. Furthermore, the two roll-on and roll-off diaphragms are subject to relatively high wear for functional reasons. Finally, DE 112011101201 B4 does not disclose any technical solution for a pressure medium-based valve actuation.

DE 102015223943 A1 discloses a mechanically settable pressure-regulating diaphragm valve of seat-type design. The rubber-elastic diaphragm serves for separating a spring chamber from a regulating chamber and is coupled in a force-transmitting manner to a separate valve member. The solenoid valve disclosed by DE 102015223943 A1 has a relatively complex construction composed of small parts for design reasons and has a large number of dead spaces. In particular, there is inadequate cleanability and sterilizability of the regulating chamber, which is connected to the regulated secondary channel for example via a pressure-tapping channel with an only small line cross section.

DE 19711262 A1 discloses a 3/3 solenoid valve of seat-type design with a closure element composed of an elastic sealing material which is either fastened directly to an armature of a proportional magnet or is arranged directly on an actuating drive and which is formed with a stop on that side thereof which faces away from the actuating drive or the armature, said stop corresponding to a valve seat for venting. In both disclosed basic embodiments, the closure element provided according to DE 19711262 A1 has a relatively complex and wear-susceptible construction in that it is either physically fastened directly to an armature and, as a movement seal, bears, at the periphery, sealingly against a surrounding wall of a guide bore or it is designed in the manner of a diaphragm for use as a pressure-regulating valve and, on its side facing a control chamber, is designed with a second stop which serves for stiffening of the diaphragms in the area of action of the valve seat for venting and which at the same time serves as an end-position delimitation. Moreover, for realizing the 3/3-way functionality, the valve disclosed by DE 19711262 A1 is, in all the embodiment variants, altogether designed relatively complexly with a valve sleeve and multiple sealing rings and springs.

JP 2001208237 A discloses a seat valve of piston-type design whose valve piston is formed integrally with a sealing seat and which has a corrugated bellows-type portion and has an inner fluid channel. For switching of the piston, the two control surfaces thereof can be alternately acted on via an upper and a lower control chamber, with respect to which the piston is sealed off by way of an encircling sealing ring. The lower control chamber is separated from a working chamber via an additional seal collar which extends radially from the sealing seat of the piston. The seat valve disclosed by JP 2001208237 A has a relatively complex construction owing to the selected functioning and requires a relatively large structural space.

U.S. Pat. No. 2,942,837 A discloses a pressure-equalized diaphragm seat valve with a diaphragm which is arranged between two chambers. The diaphragm is formed integrally with a hollow projection which has a fluid channel and which at the same time forms a sealing seat. For ensuring an equalization of the pressure on both sides of the diaphragm, the latter is extended through by a pressure-equalization opening. Consequently, there is no separation of media between the chambers formed on both sides of the diaphragm. Furthermore, the same pressure medium, upon opening of the sealing seat formed by the diaphragm, flows through the fluid channel arranged in the sealing seat. The diaphragm seat valve disclosed by U.S. Pat. No. 2,942,837 A is therefore not suitable for applications in which a separation of different control and working media is necessary for ensuring hygiene requirements.

SUMMARY

The disclosure is based on the object of avoiding the disadvantages presented. In particular, the intention is to provide a diaphragm valve with the simplest possible construction and with few components and with good cleanability of the valve regions flowed through by a working fluid.

The object is achieved according to the disclosure by a diaphragm seat valve as claimed in claim 1. Advantageous refinements of the disclosure are specified in the dependent claims.

The core of the disclosure is formed by a diaphragm seat valve having a shape-elastic control diaphragm which separates a control chamber from a working chamber, in which the control diaphragm is formed integrally with a hollow projection on that side thereof which faces the control chamber or the working chamber of the diaphragm seat valve and with a diaphragm valve seat on that side thereof which faces the working chamber, wherein the interior space of the hollow projection opens out into the diaphragm valve seat, and the hollow projection is connected to a fluid channel of the diaphragm seat valve. The control diaphragm is simple to control in that the control chamber is subjected to a fluid pressure which is higher in comparison with the working chamber or an actuating force is exerted on the diaphragm from the direction of the control chamber. In this case, the control diaphragm bulges in the direction of the working chamber, wherein at the same time the diaphragm valve seat moves in this direction. In the opposite case, in which the working chamber is subjected to a pressure which is higher in comparison with the control chamber, the control diaphragm bulges in the direction of the control chamber, wherein at the same time the diaphragm valve seat moves in this direction. In the second movement direction of the diaphragm valve seat, a fluid connection via the interior space of the hollow projection to that fluid channel of the diaphragm seat valve to which the hollow projection is connected can be opened up. With the diaphragm seat valve according to disclosure, a reduction in components is achieved in that a valve seat is integrated directly into the control diaphragm itself. The integration of a hollow projection connected to a fluid channel at the same time avoids dead spaces. The diaphragm seat valve according to the disclosure has good ability for cleaning of all the valve regions flowed through by a working fluid, since the interior space of the hollow projection and the diaphragm valve seat formed by the control diaphragm can be flushed in a simple manner. The control diaphragm, together with the functional parts formed thereby, can be produced structurally easily and inexpensively integrally as an elastomer and/or plastic molded part. In particular, the control diaphragm, with the hollow projection and the diaphragm valve seat, can be produced in a simple manner as an elastomer in a single primary forming or forming manufacturing step.

A connection of the hollow projection to the fluid channel is achieved in a simple manner in that the hollow projection is formed such that it can be plugged into an opening of the fluid channel or can be plugged onto this.

In a simple configuration, the diaphragm seat valve is preferably designed with a movable closure element which comprises a first closure means which corresponds to the diaphragm valve seat.

In a structurally simple embodiment, the closure element is mounted in an axially movable manner against the diaphragm valve seat. If the control chamber is subjected to a fluid pressure which is higher in comparison with the working chamber or if an actuating force is exerted on the control diaphragm from the direction of the control chamber, the control diaphragm bulges in the direction of the working chamber, wherein at the same time the diaphragm valve seat and the first closure means, which corresponds to said valve seat and which is axially movably mounted, move in this direction. If the working chamber is subjected to a pressure which is higher in comparison with the control chamber, the control diaphragm bulges in the direction of the control chamber, wherein at the same time the diaphragm valve seat moves in this direction. In the second movement direction of the diaphragm valve seat, a fluid connection via the interior space of the hollow projection to the fluid channel can be opened up.

For simplifying the return movement and for improving the sealing seat, the closure element is designed so as to be spring-loaded against the diaphragm valve seat.

For realizing a 3-way functionality, the closure element is preferably in the form of a double closure element which, on its side facing away from the control diaphragm, is formed with a second closure means which corresponds to a second valve seat formed in the diaphragm seat valve.

In an embodiment as a 3/3-way valve, a second working chamber is arranged below the second valve seat, and the double closure element extends through the second valve seat in that the second closure means acts sealingly against the second valve seat, or engages into it, on the side facing the second working chamber. If, in this embodiment, the control chamber is subjected to a fluid pressure which is higher in comparison with the working chamber or if an actuating force is exerted on the control diaphragm from the direction of the control chamber, the control diaphragm bulges in the direction of the working chamber, wherein at the same time the diaphragm valve seat and the double closure element, which corresponds to said valve seat and which is axially movably mounted, move in this direction. In this case, the second closure means lifts off from the second valve seat and opens up a fluid connection between the working chamber and the second working chamber. Upon removal of the excess pressure or the actuating force, the control diaphragm and the double closure element return to their starting position again, so that the fluid connection is closed again. If the working chamber is subjected to a pressure which is higher in comparison with the control chamber, the control diaphragm bulges in the direction of the control chamber, wherein at the same time the diaphragm valve seat moves in this direction and opens up a fluid connection between the working chamber and the fluid channel.

In a structurally simple embodiment, the the double closure element has the shape of a dumbbell, wherein the first closure means and the second closure means each have a spherical shape.

In a structurally simple embodiment, the control diaphragm is designed such that it can be controlled electromagnetically via the control chamber. In this case, on that side of the control diaphragm which faces the control chamber, an electromagnetically movable actuating element preferably acts on said control diaphragm.

In an alternative structurally simple embodiment, the control diaphragm can be subjected to a control pressure via the control chamber.

BRIEF DESCRIPTION OF THE DRAWINGS

Further advantages of the disclosure are illustrated in more detail below on the basis of the figures, together with the description of preferred exemplary embodiments of the disclosure. In the figures.

DETAILED DESCRIPTION

Figure 1:
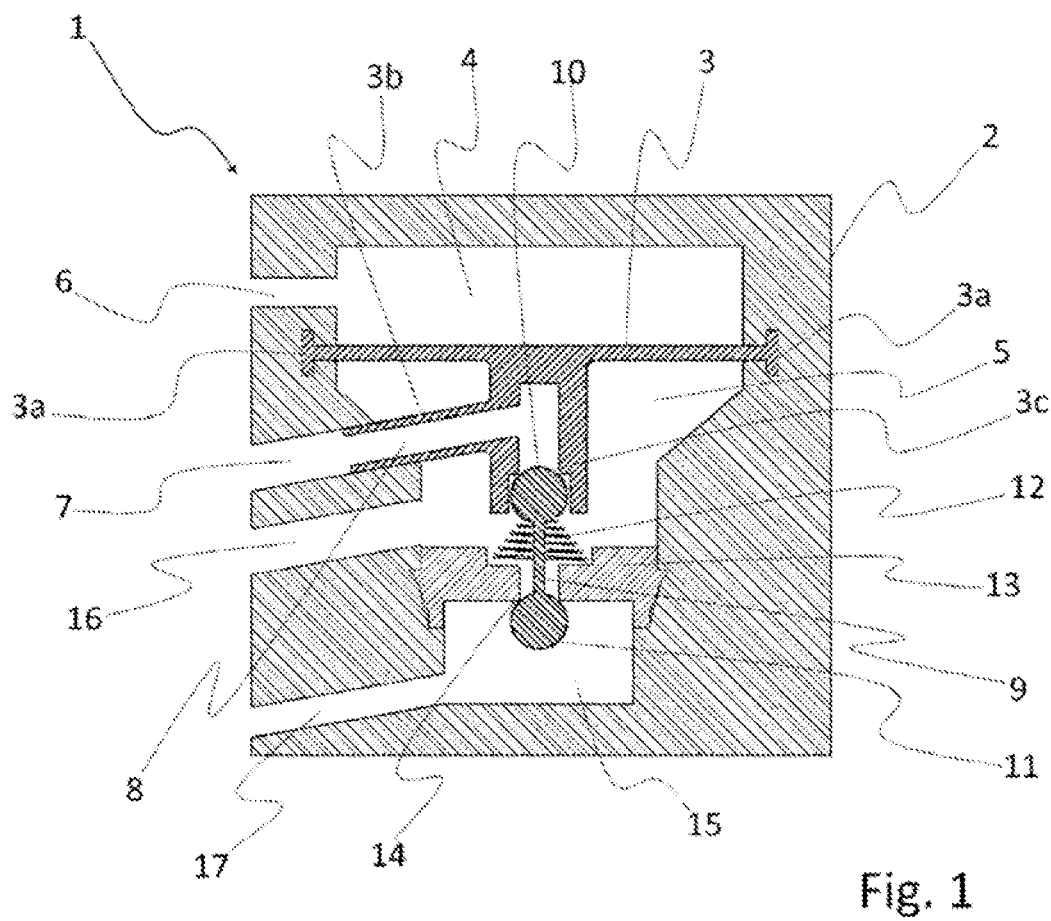
FIG. 1 shows a schematic sectional illustration of a diaphragm seat valve.

FIG. 1 shows the diaphragm seat valve 1 in a schematic sectional illustration. In the valve housing 2, the flat control diaphragm 3, which consists of a shape-elastic material, is clamped at an edge side by way of the encircling bead 3a. The control diaphragm 3 separates the control chamber 4 fluidically from the working chamber 5. The control channel 6, via which the control chamber 4 can be subjected to a control pressure, opens out into the control chamber 4. On its side facing the working chamber 5, the control diaphragm 3 is formed integrally with the hollow projection 3b, which is plugged in a form-fitting manner into the venting channel 7. Also on its side facing the working chamber 5, the control diaphragm 3 is formed integrally with the diaphragm valve seat 3c. The interior space 8 of the hollow projection 3b opens out into the diaphragm valve seat 3c. The axially movably mounted double closure element 9 is arranged below the diaphragm valve seat 3c. The double closure element 9 has the shape of a dumbbell with a spherical first closure means 10 and with a second closure means 11 connected thereto via a web. The double closure element 9 is held, so as to be spring-loaded by way of the compression spring 12, between the diaphragm valve seat 3c and the valve insert 13, the latter forming on its bottom side the second valve seat 14. Here, the double closure element 9 extends through the valve insert 13 and the second valve seat 14, wherein the second closure means 11 acts sealingly against the second valve seat 14 on the side facing the second working chamber, which functions as inlet-pressure chamber 15 in the present exemplary embodiment. The outlet channel 16 opens out into the working chamber 5. The inlet channel 17 opens out into the inlet-pressure chamber 15.

The illustration in FIG. 1 shows the diaphragm seat valve 1 in its rest position, in which there is no pressure difference between the control chamber 4 and the working chamber 5. The venting channel 7 is separated fluidically from the working chamber 5 and the outlet channel 16 by way of the sealing seat of the first closure means 10 in the diaphragm valve seat 3c. At the same time, the outlet channel 16 and the working chamber are separated fluidically from the inlet-pressure chamber 15 and the inlet channel 17 by way of the sealing seat of the second closure means 11 in the second valve seat 14. By subjecting the control chamber 4 to a fluid pressure which is higher in comparison with the working chamber 5, the control diaphragm 3 bulges in the direction of the working chamber 4, wherein at the same time the hollow projection 3b, which is formed integrally with said control diaphragm and thus likewise consists of a shape-elastic material, is bent slightly. By way of the stroke movement of the control diaphragm 3, the diaphragm valve seat 3c and the double closure element 9 are displaced axially counter to the loading of the compression spring 12. In this case, the second closure means 11 is detached from the second valve seat 14. The inlet channel 17 and the inlet-pressure chamber 15 are in fluid connection with the working chamber 5 and the outlet channel 16. Upon removal of the excess pressure in the control chamber 4, the control diaphragm 3 and the double closure element 9 return to their rest position again, so that the fluid connection is closed again. If the working chamber 5 is subjected to a pressure which is higher in comparison with the control chamber 4, for example as a consequence of a load change at the outlet channel 16, the control diaphragm 3 bulges in the direction of the control chamber 4, wherein at the same time the diaphragm valve seat 3c is displaced axially in this direction. The shape-elastic hollow projection 3b is bent slightly, corresponding to the stroke of the control diaphragm 3. By way of the stroke movement, the diaphragm valve seat 3c lifts off from the first closure means 10 and opens up a fluid connection between the outlet channel 16, the working chamber 5 and the venting channel and the atmosphere. Thus, in the case in which an excess pressure in the working chamber 5 arises, the outlet channel 16 can be vented via the venting channel 7.

The diaphragm seat valve 1 is structurally easy to produce with relatively few components. The control diaphragm, together with the functional parts formed thereby, can be produced structurally easily and inexpensively integrally as a plastic molded part, for example as an elastomer in a single primary forming or forming manufacturing step. It is also the case that the valve insert 13, with the second valve seat 14, is simple to produce as a plastic molded part and can be fitted in a corresponding cutout in the valve housing 2 via a simple snap-in fitting process. As form-fitting contact seals without significant friction moments, all the sealing seats of the diaphragm seat valve 1 are low-wear. The double closure element 9 can be inserted simply into the valve insert 13 as by means of a widening and/or pressing-in fitting process. The diaphragm seat valve 1 furthermore has good cleanability since all the components and regions below the control diaphragm 3 can be flushed in a simple manner in that, at the outlet channel 16 or at the inlet channel 17, a cleaning medium, for example a heated cleaning gas or a cleaning liquid, is introduced at sufficient pressure. In the case of the cleaning medium being introduced via the inlet channel 17, the control chamber 4 is subjected to pressure beforehand or at the same time in order to detach the second closure means 11 from the second valve seat 14 and to establish a fluid connection to the working chamber 5 and to the outlet channel 16. The working region of the diaphragm seat valve 1 can thus be thoroughly cleaned and, according to cleaning medium used, disinfected too. At the same time, the venting region of the diaphragm seat valve 1 is simple to clean in that cleaning medium is introduced at pressure via the venting channel 7 counter to the force of the compression spring 12.

Figure 2:
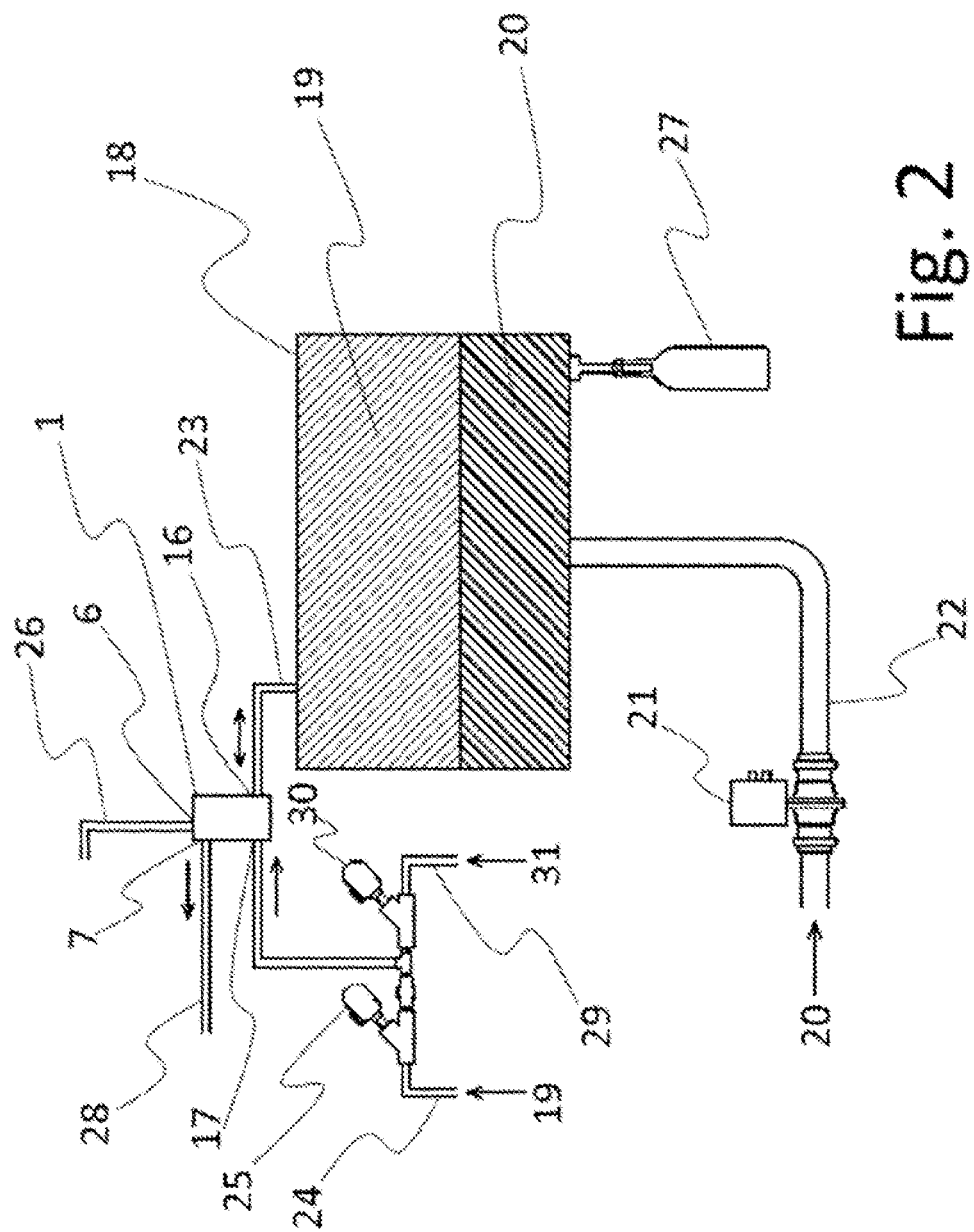
FIG. 2 shows a schematic circuit diagram of a bottle-filling installation with a diaphragm seat valve as per FIG. 1.

FIG. 2 shows the diaphragm seat valve 1 in an exemplary application for filling control as a schematic circuit diagram of a bottle-filling installation. The tank 18 is filled partially with a gaseous control medium 19 and with a liquid filling medium 20. The feeding of the filling medium 20 to the tank 18 is realized via the first feed line 22, which is controlled by way of the switching valve 21. The feeding of the control medium 19 to the tank 18 is realized via the further feed line 23, which is controlled by way of the diaphragm seat valve 1. For this purpose, the inlet channel 17 of the diaphragm seat valve 1 can be connected to the inlet line 24 for the control medium 19. The inlet line 24 can be shut off via the first shut-off valve 25. The control of the filling of the bottle 27 is realized, with simultaneously enabled feeding of the filling medium 20, via the regulation of the fluid pressure of the control medium 19 in the tank 18 by way of the diaphragm seat valve 1. For this purpose, the control channel 6 of the diaphragm seat valve 1 can be subjected to a fluid pressure via the control line 26. If the control channel 6 is subjected to a sufficiently high fluid pressure, the diaphragm seat valve 1 opens and, via the outlet channel 16 and the feed line 23, delivers to the tank 18 the control medium 19 coming in via the inlet line 24. The filling of the bottle 27 is realized at the elevated pressure of the control medium 19 in the tank 18. If there is a positive pressure at the outlet channel 16, venting is realized via the venting channel 7 of the diaphragm seat valve 1 and the venting line 28. For cleaning the working region of the diaphragm seat valve 1 and the tank 18, the inlet line 24 is shut off via the first shut-off valve 25 and the the flushing line 29 is opened via the via the second shut-off valve 30, so that a cleaning fluid 31 can be introduced into the system in a CIP or SIP process. In this case, the diaphragm seat valve 1 is simultaneously subjected to pressure via the control channel 6 in order to detach the second closure means 11 from the second valve seat 14 and to establish a fluid connection to the working chamber 5 and to the outlet channel 16.

The bottle-filling installation as per FIG. 2 has the advantage that, during operating or during cleaning, it is not necessary to pay attention to contamination of the diaphragm seat valve 1 by the filling medium 20 since the working and venting regions thereof can be cleaned simply and thoroughly.

Figure 3:
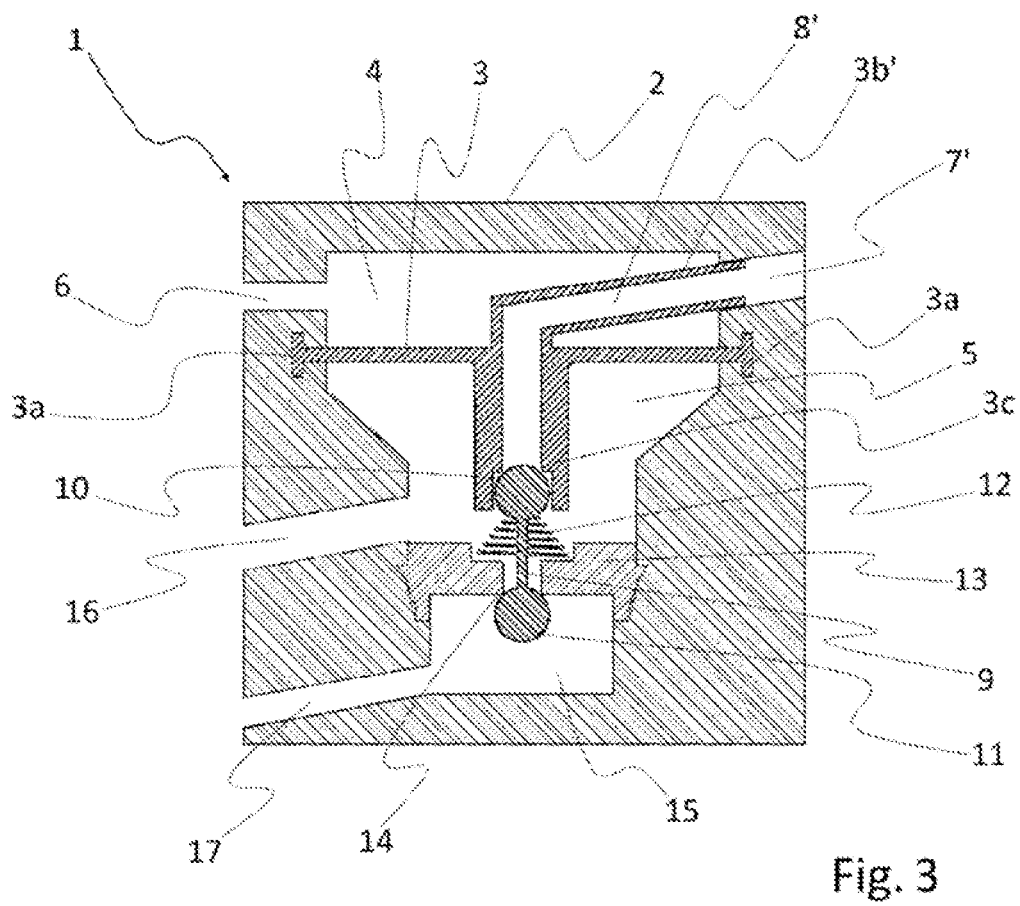
FIG. 3 shows a schematic sectional illustration of an alternative embodiment of the diaphragm seat valve as per FIG. 1.
Figure 4:
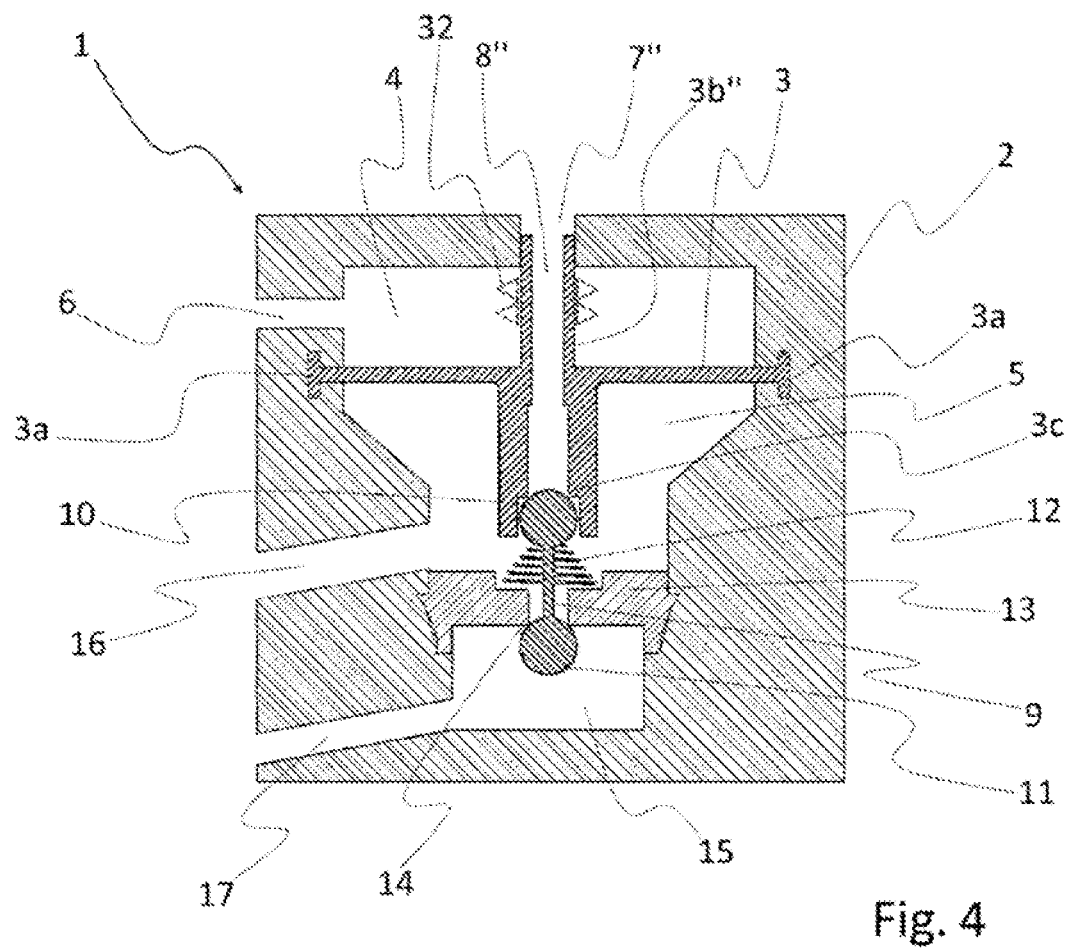
FIG. 4 shows a schematic sectional illustration of a further alternative embodiment of the diaphragm seat valve as per FIG. 1.

FIGS. 3 and 4 show alternative embodiments of the diaphragm seat valve 1, in which the hollow projection 3*b*' and 3*b*" is in each case arranged on the side which faces the control chamber (4). Here, the above-described functioning remains the same. In the case of the embodiment as per that in FIG. 4, the hollow projection 3*b*" is however arranged perpendicularly to the plane of the control diaphragm 3, and for this reason the diaphragm stroke cannot be compensated by a bending movement of the hollow projection 3*b*". Therefore, for compensation of the diaphragm stroke in the axial direction, either the hollow projection 3*b*" is formed via a sub-portion with a corrugated bellows 32 (shown by dashed lines in FIG. 4), or the hollow projection 3*b*" is arranged in an axially sliding manner in the venting channel 7" and is mounted in the venting channel 7" by way of a movement seal, for example an annular seal or sealing sleeve (neither being illustrated in FIG. 4), engaging around it.

LIST OF REFERENCE SIGNS

1 Diaphragm seat valve
2 Valve housing
3 Control diaphragm
3*a* Bead
3*b*, 3*b*', 3*b*" Hollow projection
3*c* Diaphragm valve seat
4 Control chamber
5 Working chamber
6 Control channel
7, 7', 7" Venting channel
8, 8', 8" Interior space
9 Double closure element
10 First closure means
11 Second closure means
12 Compression spring
13 Valve insert
14 Second valve seat
15 Inlet-pressure chamber
16 Outlet channel
17 Inlet channel
18 Tank
19 Control medium
20 Filling medium
21 Switching valve
22, 23 Feed line
24 Inlet line
25, 30 Shut-off valve
26 Control line
27 Bottle
28 Venting line
29 Flushing line
31 Cleaning fluid
32 Corrugated bellows

The invention claimed is:

1. A diaphragm seat valve comprising:
a housing;
a shape-elastic control diaphragm located in the housing and configured to separate a control chamber of the diaphragm seat valve from a working chamber of the diaphragm seat valve, the control diaphragm defining a first side facing the control chamber and an opposite second side facing the working chamber;
a hollow projection formed integrally with the control diaphragm and extending from at least one of the first side and the second side of the control diaphragm, the hollow projection defining an interior space, and the hollow projection including a first end and a second end;
a diaphragm valve seat located on the second side of the control diaphragm at the first end of the hollow projection, the diaphragm valve seat defining a first fluid channel; and
a movable closure element including a first closure member configured to be removably seated in the diaphragm valve seat,
wherein the interior space of the hollow projection is fluidly connected to the first fluid channel of the diaphragm valve seat, and
wherein the second end of the hollow projection is plugged into or onto an opening defining a second fluid channel in the housing, such that the interior space of the hollow projection and the first fluid channel are fluidly connected to the second fluid channel.

2. The diaphragm seat valve as claimed in claim 1, wherein the control diaphragm is controlled electromagnetically via the control chamber.

3. The diaphragm seat valve as claimed in claim 1, wherein the control diaphragm is subjected to a control pressure via the control chamber.

4. The diaphragm seat valve as claimed in claim 1, wherein the movable closure element extends through the first end of the hollow projection.

5. The diaphragm seat valve as claimed in claim 1, wherein the second fluid channel is connected to atmosphere.

6. The diaphragm seat valve as claimed in claim 1, wherein the closure element is mounted in an axially movable manner against the diaphragm valve seat.

7. The diaphragm seat valve as claimed in claim 6, further comprising:
a compression spring configured to spring-load the first closure member of the closure element against the diaphragm valve seat.

8. The diaphragm seat valve as claimed in claim 6, wherein:
the closure element further includes a second closure member located opposite the first closure member and facing away from the control diaphragm,
the housing defines a second valve seat, and
the second closure member is configured to be removably seated in the second valve seat.

9. The diaphragm seat valve as claimed in claim 8, wherein:
the working chamber is a first working chamber,
the second valve seat separates the first working chamber from a second working chamber arranged below the second valve seat,
a connecting shaft of the double closure element connects the first closure member to the second closure member,
the connecting shaft extends through the second valve seat, and
the second closure member acts sealingly against the second valve seat on a side of the second valve seat facing the second working chamber.

10. The diaphragm seat valve as claimed in claim 9, wherein:
the double closure element has the shape of a dumbbell, and
the first closure member and the second closure member each have a spherical shape.

11. The diaphragm seat valve as claimed in claim 9, wherein:
a fluid connection between the second fluid channel and the first working chamber is established by a stroke movement of the control diaphragm in a direction towards the control chamber, and
a fluid connection between the first working chamber and the second working chamber is established by a stroke movement of the control diaphragm in an opposite direction away from the control chamber.

* * * * *